United States Patent
Orimoto et al.

(10) Patent No.: US 7,562,888 B2
(45) Date of Patent: Jul. 21, 2009

(54) VEHICULAR SUSPENSION SYSTEM

(75) Inventors: Yukihiro Orimoto, Saitama (JP);
Norikazu Kurosu, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 264 days.

(21) Appl. No.: 10/541,238

(22) PCT Filed: Dec. 22, 2003

(86) PCT No.: PCT/JP03/16480

§ 371 (c)(1),
(2), (4) Date: Jan. 30, 2006

(87) PCT Pub. No.: WO2004/062950

PCT Pub. Date: Jul. 29, 2004

(65) Prior Publication Data

US 2006/0220338 A1    Oct. 5, 2006

(30) Foreign Application Priority Data

Jan. 8, 2003    (JP) .............................. 2003-001797

(51) Int. Cl.
*B60G 3/18* (2006.01)
(52) U.S. Cl. ............................................. 280/124.141
(58) Field of Classification Search .......... 280/124.141, 280/124.135, 124.151, 124.179
See application file for complete search history.

(56) References Cited

U.S. PATENT DOCUMENTS

| | | | |
|---|---|---|---|
| 2,779,603 A | 1/1957 | McRae | |
| 3,111,307 A | 11/1963 | Cuskie | |
| 4,456,282 A | 6/1984 | Rumpel | |
| 4,458,913 A | 7/1984 | Rumpel | |
| 4,744,549 A * | 5/1988 | von der Ohe et al. | 267/287 |

FOREIGN PATENT DOCUMENTS

| | | |
|---|---|---|
| EP | 505282 A1 * | 9/1992 |
| JP | 56-60707 | 5/1981 |
| JP | 2-144207 | 6/1990 |
| JP | 3-121915 A | 5/1991 |
| JP | 04-183620 | 6/1992 |
| JP | 8-108720 | 4/1996 |

(Continued)

*Primary Examiner*—Faye M. Fleming
(74) *Attorney, Agent, or Firm*—Arent Fox LLP

(57) ABSTRACT

A vehicular suspension system is provided in which the lower end of a coil spring (16) is positioned lower than a support part (30) where a suspension arm (14) is supported on a vehicle body, the lower end of the coil spring (16) is positioned on the laterally inner side of the vehicle body relative to the upper end of the coil spring (16), and when a wheel (W) rebounds and the coil spring (16) is elongated, the lower end of the coil spring (16) can therefore move along its axis. As a result, the coil spring (16) can be prevented from bending at a time of rebound, the spring constant thus increases, and the lower end of the coil spring (16) is pressed strongly against a spring seat (51) and thus prevented from lifting, thereby preventing any degradation in the turning performance. This can prevent the lower end of the coil spring of the vehicular suspension system from lifting from the spring seat when the coil spring is elongated, thus preventing any degradation in the turning performance.

5 Claims, 6 Drawing Sheets

FOREIGN PATENT DOCUMENTS

| | | |
|---|---|---|
| JP | 8-175142 | 7/1996 |
| JP | 8-295114 | 11/1996 |
| JP | 9-118115 | 5/1997 |
| JP | 11-034625 A | 2/1999 |
| JP | 11-115428 | 4/1999 |
| JP | 2605811 | 6/2000 |
| JP | 2002-264624 A | 9/2002 |

* cited by examiner

AT 1G

AT REBOUND

AT 1G

AT REBOUND

AT 1G

AT REBOUND

VEHICULAR SUSPENSION SYSTEM

CROSS-REFERENCE TO RELATED APPLICATION

This application is a National Stage entry of International Application Number PCT/JP03/16480, filed Dec. 22, 2003. The disclosure of the prior application is hereby incorporated herein in its entirety by reference.

1. Field of the Invention

The present invention relates to a vehicular suspension system in which the lower end of a coil spring is supported on a suspension arm that vertically movably supports a knuckle, and the upper end of the coil spring is supported on a vehicle body. The present invention also relates to a vehicular suspension system in which a suspension arm is arranged so that a knuckle rotates rearward when a rear wheel rebounds.

2. Background Art

A vehicular suspension system in which a knuckle is vertically movably supported by a suspension arm, the suspension arm is connected to a vehicle body by a coil spring, and the knuckle is connected to the vehicle body by a shock absorber is known from the following Patent Document.

[Patent Document]
Japanese Utility Model Registration Publication No. 2605811

When a vehicle turns, a centrifugal force directed toward the outside of the turn acts on the center of gravity of the vehicle, and since the center of gravity of the vehicle is naturally higher than the contact point of a tire, the centrifugal force attempts to make the vehicle topple over toward the outside of the turn. As a result, a suspension system coil spring toward the outside of the turn is compressed and pressed against a spring seat of a suspension arm, and a suspension system coil spring toward the inside of the turn is elongated and attempts to lift from a spring seat of a suspension arm.

When the coil spring thus lifts from the spring seat, the spring constant of the coil spring decreases substantially, the stroke of a wheel on the inside of the turn increases, and there is a possibility that the vehicle body might rise and the tire might easily lift from the road surface, thus degrading the turning performance of the vehicle.

DISCLOSURE OF INVENTION

The present invention has been accomplished under the above-mentioned circumstances, and it is an object thereof to prevent any degradation in turning performance by preventing the lower end of a coil spring of a vehicular suspension system from lifting from a spring seat when the coil spring is elongated.

In order to achieve the above object, in accordance with a first aspect of the present invention, there is provided a vehicular suspension system in which the lower end of a coil spring is supported on a suspension arm that vertically movably supports a knuckle and the upper end of the coil spring is supported on a vehicle body, characterized in that the lower end of the coil spring is lower than a support part where the suspension arm is supported on the vehicle body, and the lower end of the coil spring is on the laterally inner side of the vehicle relative to the upper end of the coil spring.

In accordance with this arrangement, since the lower end of the coil spring is lower than the support part where the suspension arm is supported on the vehicle body, and the lower end of the coil spring is on the laterally inner side of the vehicle relative to the upper end of the coil spring, when a wheel rebounds and the coil spring is elongated, the lower end of the coil spring can move along its axis. As a result, the coil spring is prevented from bending at a time of rebound, the spring constant thus increases, and the lower end of the coil spring is pressed strongly against a spring seat and thus prevented from lifting, thereby preventing any degradation in the turning performance.

In accordance with a second aspect of the present invention, there is provided a vehicular suspension system in which the lower end of a coil spring is supported on a suspension arm that vertically movably supports a knuckle and the upper end of the coil spring is supported on a vehicle body, characterized in that the angle formed by a spring seat supporting the upper end of the coil spring and a spring seat supporting the lower end of the coil spring at a time of maximum rebound of a wheel supported by the knuckle is equal to or less than the angle formed by the spring seat supporting the upper end of the coil spring and the spring seat supporting the lower end of the coil spring at a time of maximum bump.

In accordance with this arrangement, since the angle formed by the spring seat supporting the upper end of the coil spring and the spring seat supporting the lower end thereof at a time of maximum rebound of the wheel is equal to or less than the angle at a time of maximum bump, when the wheel rebounds to the maximum and the coil spring is elongated, bending of the coil spring can be suppressed to a minimum, the spring constant thus increases, and the lower end of the coil spring is pressed strongly against the spring seat and thus prevented from lifting, thereby preventing any degradation in the turning performance.

In accordance with a third aspect of the present invention, in addition to the second aspect, a straight line running through the centers of the two spring seats is orthogonal to the two spring seats.

In accordance with this arrangement, since the straight line running through the centers of the two spring seats is orthogonal to these spring seats, it is possible to maintain the axis of the coil spring in a straight line without it being curved into an S-shape, thereby ensuring a high spring constant.

In accordance with a fourth aspect of the present invention, there is provided a vehicular suspension system in which a suspension arm is arranged so that a knuckle rotates rearward when a rear wheel rebounds, characterized in that the lower end of a coil spring having an upper end thereof supported on a vehicle body is connected to the knuckle forward of an axle of the rear wheel.

In accordance with this arrangement, since the suspension arm is arranged so that the knuckle rotates rearward when the rear wheel rebounds, a compressive load is applied by the coil spring, which has its lower end connected to the knuckle forward of the axle of the rear wheel, and the wheel rate can be improved by the coil spring, thus preventing the vehicle from lifting and thereby preventing any degradation in the turning performance.

A rear lower arm 14, an upper arm 55, and a lower arm 56 of an embodiment correspond to the suspension arm of the present invention, and a joint 30 of the embodiment corresponds to the support part of the present invention.

BRIEF DESCRIPTION OF DRAWINGS

FIG. 1 to FIG. 3B show a first embodiment of the present invention; FIG. 1 is an exploded perspective view of a vehicular suspension system, FIG. 2 is a diagram for explaining the operation when a vehicle is turning, and FIG. 3A and FIG. 3B are schematic diagrams showing a state of a coil spring at a time of 1 G and at a time of rebound.

BEST MODE FOR CARRYING OUT THE INVENTION

A mode for carrying out the present invention is explained below by reference to embodiments of the present invention shown in the attached drawings.

FIG. 1 to FIG. 3B show a first embodiment of the present invention.

Figure 1:
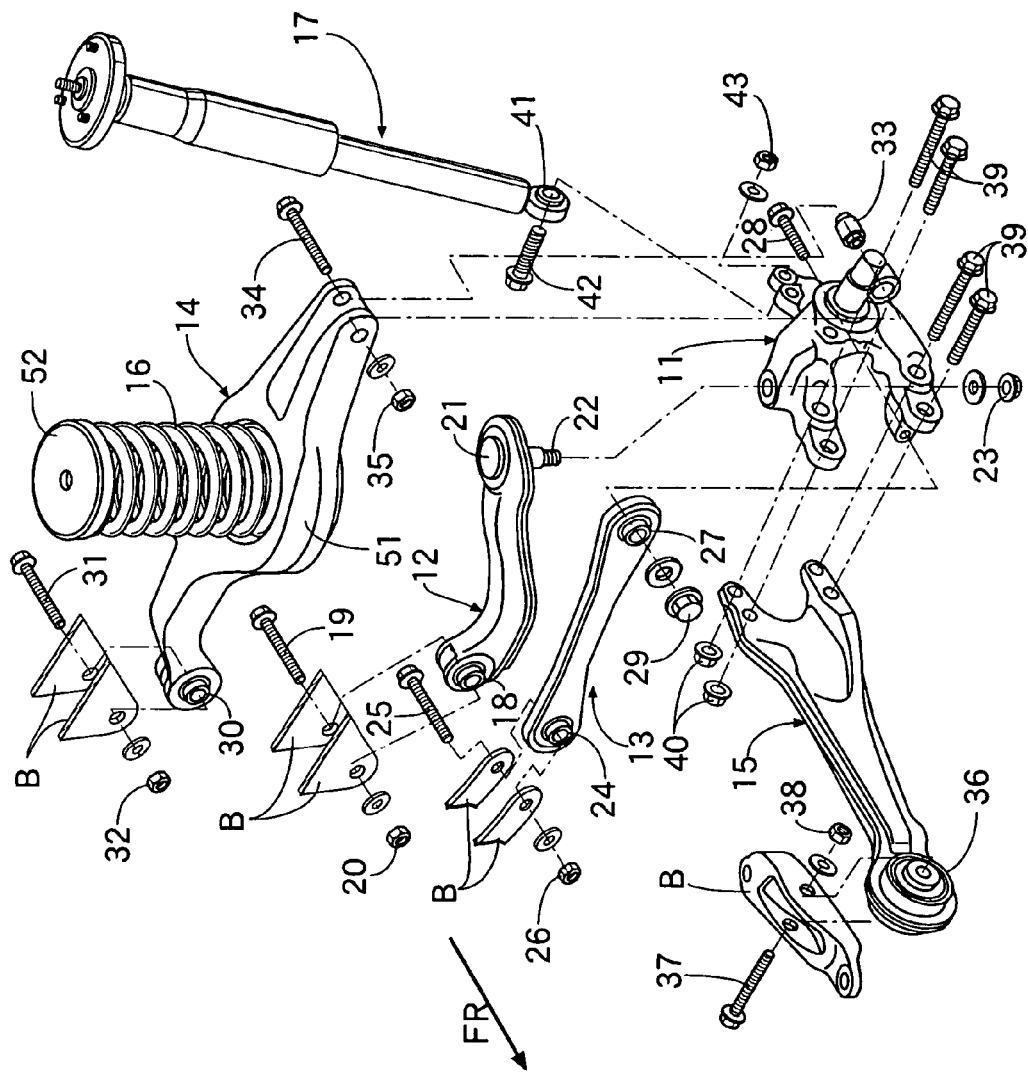

As shown in FIG. 1, a vehicular suspension system includes a knuckle 11 rotatably supporting a wheel, which is not illustrated; an upper arm 12, a front lower arm 13, a rear lower arm 14, and a trailing arm 15, which vertically movably support the knuckle 11 on a vehicle body; a coil spring 16 cushioning vertical movement of the knuckle 11; and a shock absorber 17 damping the vertical movement of the knuckle 11.

The upper arm 12 has an inner end thereof supported by a bolt 19 and a nut 20 in a bracket B on a vehicle body side via a joint 18, and has an outer end thereof supported by a bolt 22 and a nut 23 on an upper face of the knuckle 11 via a joint 21. The front lower arm 13 has an inner end thereof supported by a bolt 25 and a nut 26 in a bracket B on the vehicle body side via a joint 24, and has an outer end thereof supported by a bolt 28 and a nut 29 in a front part of the knuckle 11 via a joint 27.

The rear lower arm 14 has an inner end thereof supported by a bolt 31 and a nut 32 in a bracket B on the vehicle body side via a joint 30, and has an outer end thereof supported by a bolt 34 and a nut 35 in a rear part of the knuckle 11 via a joint 33. The trailing arm 15 has a front end thereof supported by a bolt 37 and a nut 38 in a bracket B on the vehicle body side via a joint 36, and has a rear end thereof connected by bolts 39 and nuts 40 to a front part of the knuckle 11.

The lower end of the coil spring 16 is supported on a spring seat 51 provided in a longitudinally middle section of the rear lower arm 14, and the upper end thereof is supported on a spring seat 52 provided on the vehicle body. The lower end of the shock absorber 17 is supported by a bolt 42 and a washer 43 in an upper part of the knuckle 11 via a joint 41, and the upper end thereof is supported on the vehicle body, which is not illustrated.

Figure 2:
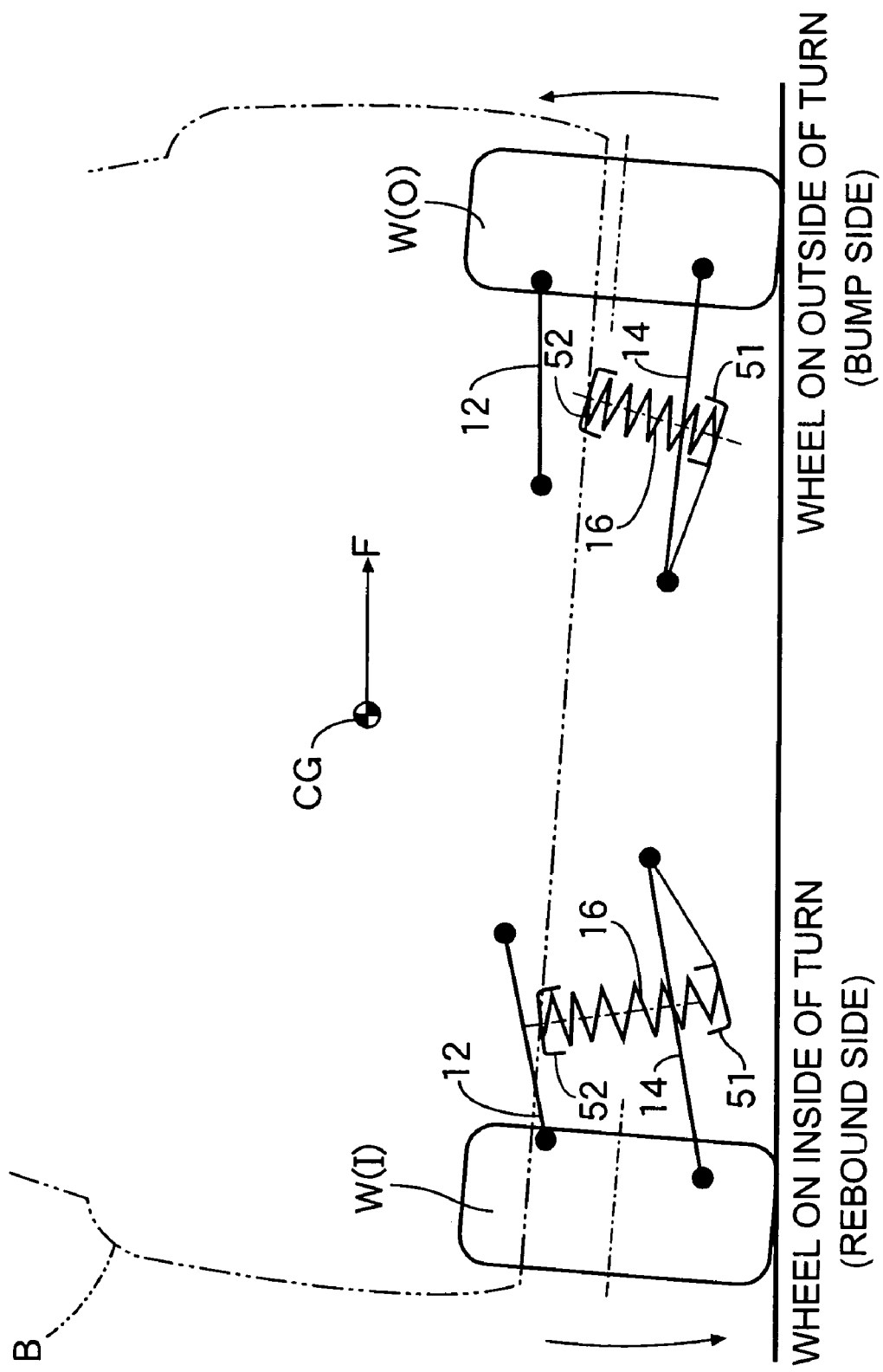

FIG. 2 shows a state in which a left-turning vehicle is viewed from behind, in which a rightward centrifugal force F acts on the center of gravity CG of the vehicle, the vehicle body B thus tilts rightward, a coil spring 16 of an outer wheel W(O) on the bump side is compressed, and a coil spring 16 of an inner wheel W(I) on the rebound side is elongated. As a result, the lower end of the coil spring 16 of the inner wheel W(I) on the rebound side easily lifts from the spring seat 51.

If the coil spring 16 lifts from the spring seat 51 in this way, since the spring constant of the coil spring 16 decreases substantially, the stroke of the inner wheel W(I) increases, the vehicle body thus rises, and there is a possibility that the inner wheel W(I) might lift from the road surface, thus degrading the turning performance of the vehicle.

Figure 3A:
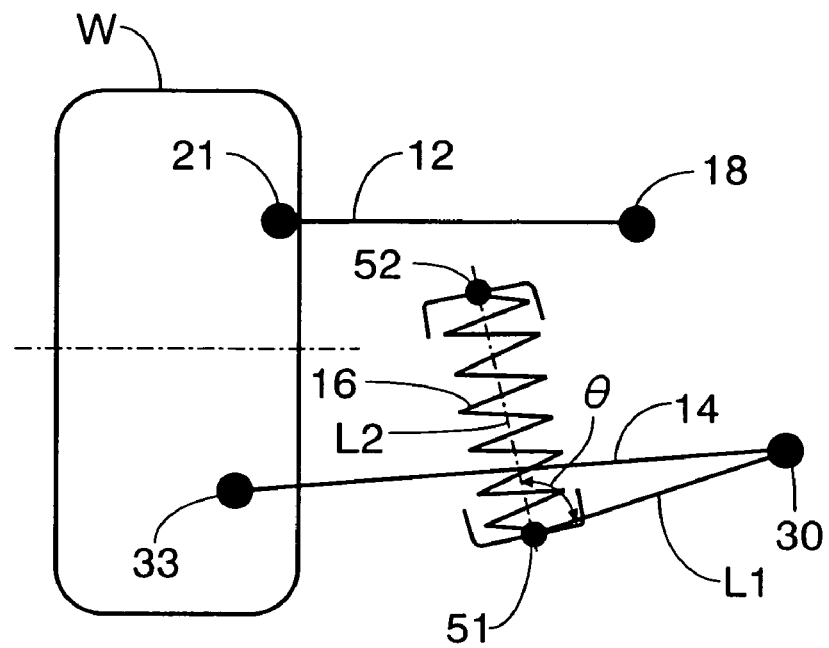

In this embodiment, as shown in FIG. 3A, in a state (1 G state) in which no load other than the vehicle body weight is applied to the coil spring 16, the coil springs 16 are arranged in an upward divergent shape when viewed along the longitudinal direction of the vehicle body. In accordance with this arrangement, the spring seat 51 supporting the lower end of the coil spring 16 is positioned lower than the joint 30 supporting the rear lower arm 14 on the vehicle body, and the spring seat 51 supporting the lower end of the coil spring 16 is positioned on the laterally inner side relative to the spring seat 52 supporting the upper end thereof.

Figure 3B:
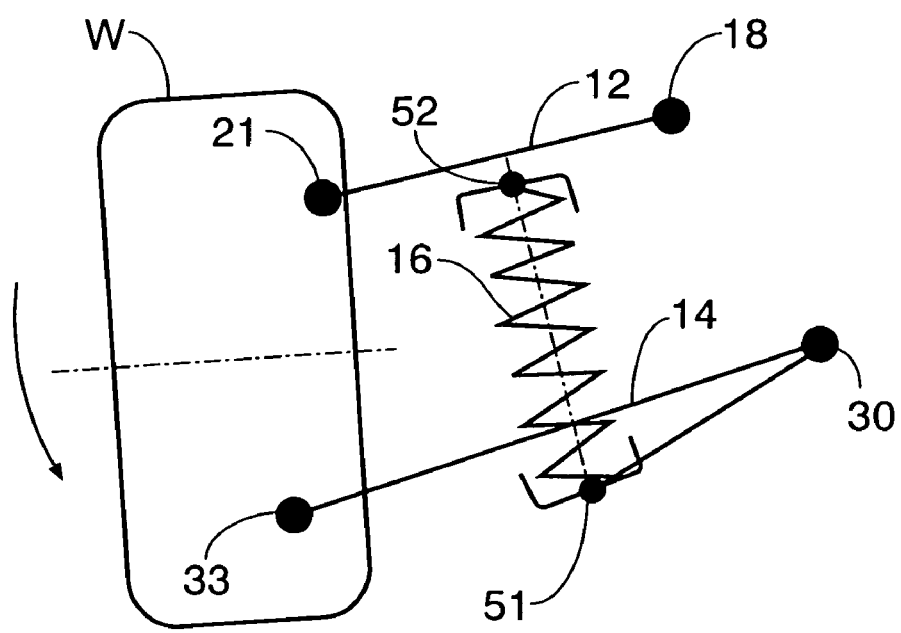

As a result, in the 1 G state, an angle θ formed between a straight line L1 connecting the lower spring seat 51 and the joint 30 and a straight line L2 connecting the upper and lower spring seats 51 and 52 becomes a substantial angle, and even when the coil spring 16 rebounds from this state as shown in FIG. 3B, since the lower spring seat 51 moves downward substantially along the straight line L2, bending of the coil spring 16 can be suppressed to a minimum. This can minimize any reduction in the spring constant of the coil spring 16 at a time of rebound, and the lower end of the coil spring 16 can be prevented from lifting from the lower spring seat 51, thereby preventing any degradation in the turning performance of the vehicle.

Figure 4A:
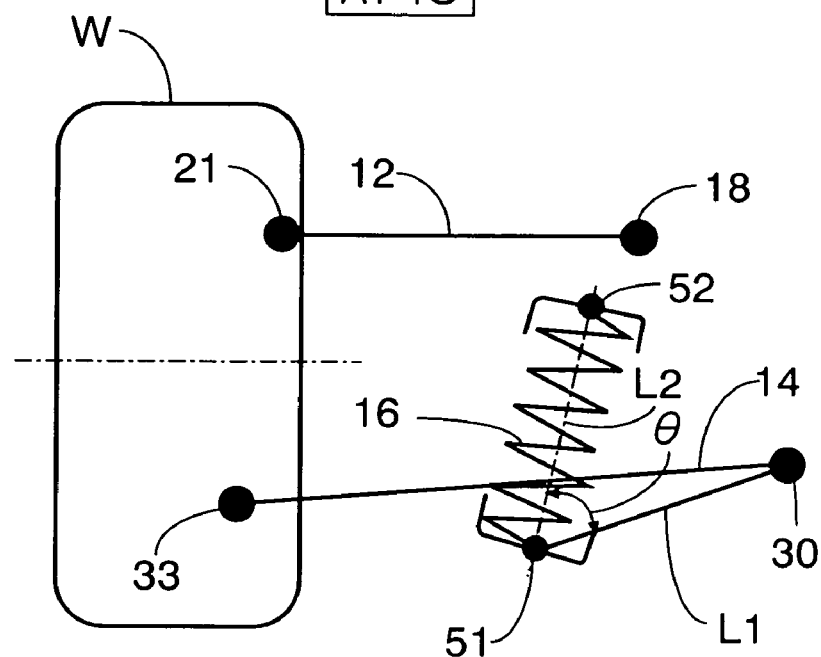
FIG. 4A and FIG. 4B are diagrams, corresponding to FIG. 3, showing a comparative example.
Figure 4B:
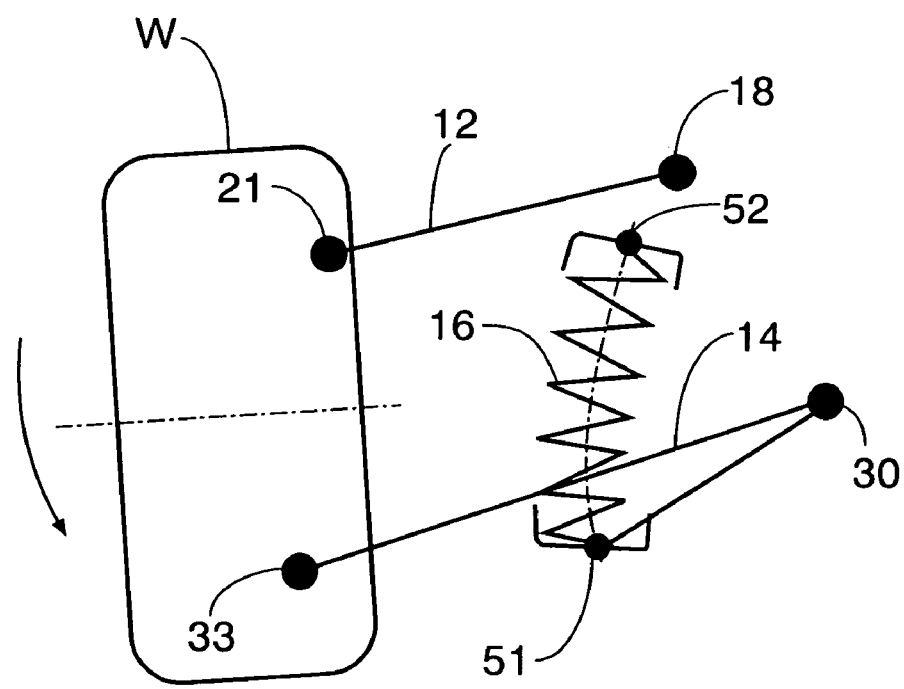

FIG. 4A and FIG. 4B show a comparative example in which the coil springs 16 are arranged in a divergent shape when viewed along the longitudinal direction of the vehicle body. As is clear from FIG. 4A, since the coil springs 16 are arranged in the divergent shape when viewed along the longitudinal direction of the vehicle body, in a 1 G state the straight line L1 connecting the lower spring seat 51 and the joint 30 and the straight line L2 connecting the upper and lower spring seats 51 and 52 intersect each other at an acute angle θ. When the coil spring 16 rebounds from this state as shown in FIG. 4B, the lower spring seat 51 moves so as to deviate inwardly from the straight line L2, a middle section of the coil spring 16 bends greatly outward of the vehicle body thus reducing the spring constant, and there is a possibility that the coil spring 16 might lift from the lower spring seat 51, thereby degrading the turning performance of the vehicle.

A second embodiment of the present invention is now explained by reference to FIG. 5A and FIG. 5B.

Figure 5A:
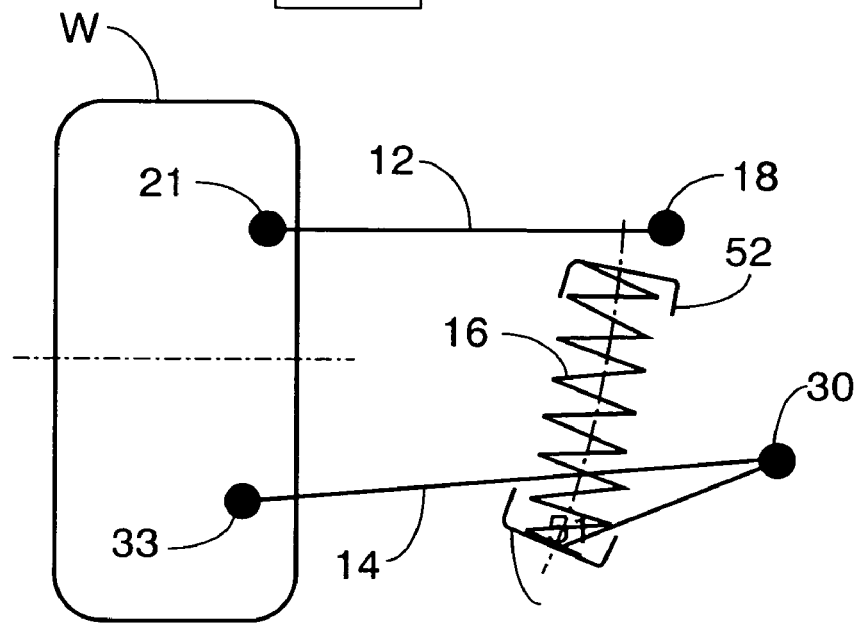
FIG. 5A and FIG. 5B are diagrams, corresponding to FIG. 3, according to a second embodiment of the present invention.
Figure 5B:
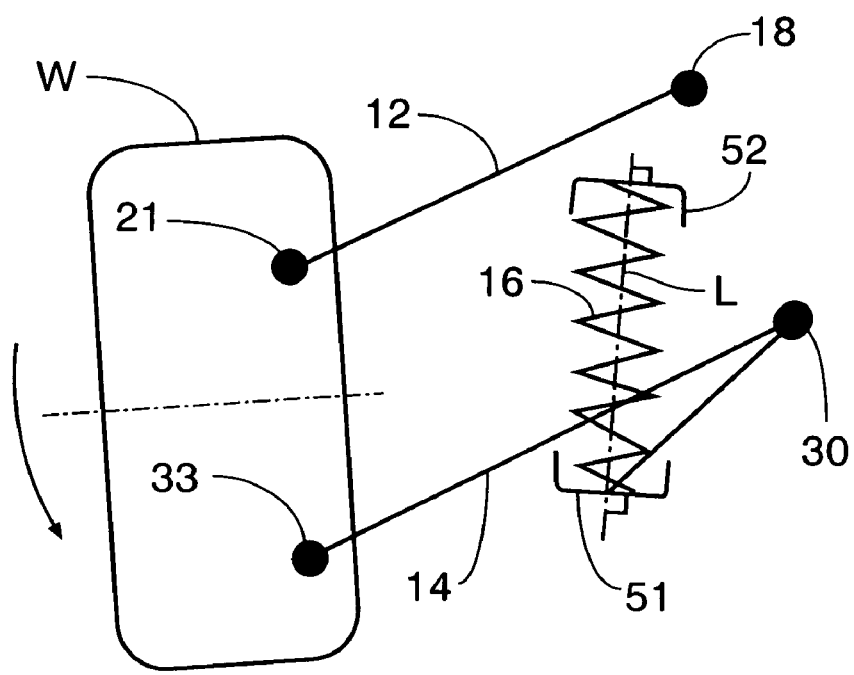

FIG. 5A shows a suspension system in a 1 G state, in which a coil spring 16 having opposite ends thereof supported by upper and lower spring seats 51 and 52 has a middle section thereof curved inwardly in advance toward a vehicle body. When the coil spring 16 rebounds from this state as shown in FIG. 5B, the lower spring seat 51 swings downward and inward with a joint 30 as the center, the upper and lower spring seats 51 and 52 are thereby made parallel, and the coil spring 16 is elongated in a straight line. During this process, in addition to the upper and lower spring seats 51 and 52 becoming parallel to each other, by making the axes of the two spring seats 51 and 52 coincide with each other, the coil spring 16 can reliably be elongated in a straight line.

By positioning the upper and lower spring seats 51 and 52 in advance so that the coil spring 16 becomes straight at a time of rebound, it is possible to prevent the coil spring 16 from bending at a time of rebound, thus increasing the spring constant, and it is thus possible to prevent the coil spring 16 from lifting from the lower spring seat 51 and the turning performance of the vehicle from being degraded.

Here, it is not always necessary for the upper and lower spring seats 51 and 52 to become parallel to each other at a time of rebound, and the angle formed between the upper and lower spring seats 51 and 52 at a time of maximum rebound may be equal to or less than this angle at a time of maximum bump. When this angle becomes 0°, that is, the upper and lower spring seats 51 and 52 become parallel to each other, by making a straight line L connecting the centers of the upper and lower spring seats 51 and 52 orthogonal to the spring seats 51 and 52 it is possible to maintain the axis of the coil spring 16 in a straight line without it curving into an S shape, thereby ensuring a yet higher spring constant.

A third embodiment of the present invention is now explained by reference to FIG. 6.

Figure 6:
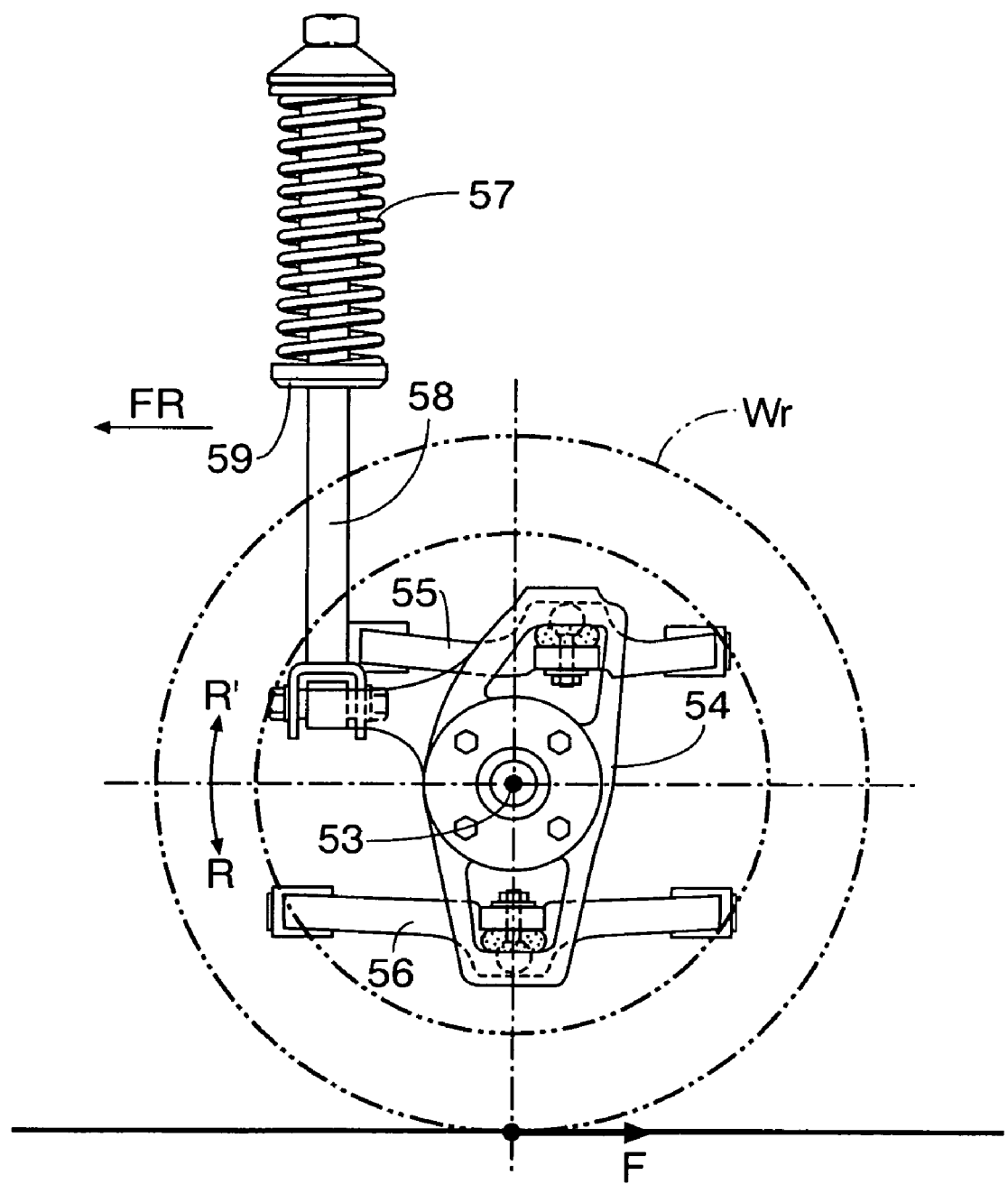
FIG. 6 is a side view of a suspension system according to a third embodiment of the present invention.

FIG. 6 shows a state in which a double wishbone type suspension system supporting a left-hand side rear wheel Wr of a motor vehicle is viewed from the side, and in which a knuckle 54 rotatably supporting an axle 53 of the rear wheel Wr is vertically movably supported on a vehicle body via an upper arm 55 and a lower arm 56, and the lower end of a shock absorber 58 disposed coaxially with a coil spring 57 forward of the axle 53 is connected to the knuckle 54.

This suspension system has a so-called anti-lift function, and in order to prevent a front part of the vehicle body from sinking and a rear part of the vehicle body from lifting when a motor vehicle is braking, the geometry of the upper arm 55 and the lower arm 56 is set so that the vehicle body is pulled downward relative to the knuckle 54 by the knuckle 54 rotating forward accompanying braking of the rear wheel Wr; in other words, the knuckle 54 is pulled upward relative to the vehicle body. That is, when the rear wheel Wr is braked, since the rear wheel Wr and the knuckle 54 are integrated via a brake caliper, the knuckle 54 together with the rear wheel Wr attempt to rotate in a forward direction shown by the arrow R by virtue of a frictional force F acting between the road surface and the tire, and since a torsional load acts on the upper arm 55 and the lower arm 56 connected to the knuckle 54, a reaction force therefrom pulls the knuckle 54 up.

As hereinbefore described, with regard to the suspension system having the anti-lift function, when the knuckle 54 rotates in the arrow R direction, the knuckle 54 is pulled up relative to the vehicle body, and this also means that, when the knuckle 54 rotates in the arrow R' direction, the knuckle 54 is pulled down relative to the vehicle body. As explained by reference to FIG. 2, since the knuckle 54 is pulled down relative to the vehicle body on the inner wheel side when the vehicle is turning, the knuckle 54 attempts to rotate in the arrow R' direction.

When the knuckle 54 rotates in the arrow R' direction, since the coil spring 57 connected to the knuckle 54 forward of the axle 53 is compressed, its elastic force increases, the wheel rate due to the coil spring 57 increases, and the vehicle can be prevented from lifting, thereby preventing any degradation in the turning performance of the vehicle.

Although embodiments of the present invention are explained in detail above, the present invention can be modified in a variety of ways without departing from the spirit and scope thereof.

For example, in the first and second embodiments, the spring seat 51 supporting the lower end of the coil spring 16 is provided on the rear lower arm 14, but it may be provided on the front rear arm 13 or the upper arm 12.

Furthermore, the suspension system of the third embodiment is not limited to the double wishbone type and may be a multi-link type. Moreover, the lower end of the coil spring 57 of the third embodiment is indirectly connected to the knuckle 54 via the shock absorber 58, but it may be connected directly to the knuckle 54.

What is claimed is:

1. A vehicular suspension system, comprising:
   a suspension arm that vertically movably supports a knuckle; and
   a coil spring with a lower end supported on the suspension arm and an upper end supported on a vehicle body,
   wherein the lower end of the coil spring is lower than a support part that connects the suspension arm to the vehicle body when no load other than the vehicle body weight is applied to the coil spring, and the lower end of the coil spring is on a laterally inner side of the vehicle relative to the upper end of the coil spring.

2. A vehicular suspension system, comprising:
   a suspension arm that vertically movably supports a knuckle, wherein the knuckle rotatably supports an axle and rotates rearward when a rear wheel rebounds; and
   a shock absorber, wherein a lower end of the shock absorber is disposed coaxially with a coil spring and is connected to the knuckle forward of an axle of the rear wheel.

3. A vehicular suspension system, comprising:
   a suspension arm that vertically movably supports a knuckle;
   a coil spring having opposite ends supported in a lower spring seat on the suspension arm and in an upper spring seat on a vehicle body,
   wherein the lower end of the coil spring is lower than a support part that connects the suspension arm to the vehicle body and the coil spring has a middle body section that is curved along an axis between the centers of the lower spring seat and upper spring seat when no load other than the vehicle body weight is applied to the coil spring.

4. The vehicular suspension system of claim 3, wherein an angle formed by an upper spring seat supporting the upper end of the coil spring and a lower spring seat supporting the lower end of the coil spring at a time of maximum rebound of a wheel supported by the knuckle is equal to or less than an angle formed by the upper spring seat and the lower spring seat at a time of maximum bump.

5. The vehicular suspension system of claim 4, wherein a straight line running through centers of the upper and lower spring seats is orthogonal relative to the upper and lower spring seats during the time of maximum rebound.

* * * * *